July 22, 1924.

H. H. TRAVIS

HEADLIGHT ATTACHMENT

Filed April 21, 1923

1,502,072

INVENTOR.
Homer H. Travis.
BY
Geo. P. Kimmel
ATTORNEY.

Patented July 22, 1924.

1,502,072

UNITED STATES PATENT OFFICE.

HOMER H. TRAVIS, OF COLUMBUS, OHIO.

HEADLIGHT ATTACHMENT.

Application filed April 21, 1923. Serial No. 633,682.

*To all whom it may concern:*

Be it known that I, HOMER H. TRAVIS, a citizen of the United States, residing at Columbus, in the county of Franklin and State of Ohio, have invented certain new and useful Improvements in Headlight Attachments, of which the following is a specification.

This invention relates to an improvement in headlight attachment, more particularly on the construction of headlight attachment as set forth in Letters Patent #1,270,672, granted to me June 25, 1918, and not only embodying the objects and advantages as embraced in the construction disclosed by said Letters Patent, but has for a further object to provide, in a manner as hereinafter set forth, a shiftable headlight attachment whereby the rays emitted by the headlight may be dimmed when an intense light is not required, such as upon the streets of a city or other illuminated highways, and including means whereby the circuit connecting plug and the illuminating element of the headlight are detachably connected to opposite ends of a shiftable carrier provided with a circuit closing device common to said plug and element, and by this arrangement when it is desired to increase or decrease the glare of the light rays emitted from the illuminating element, the carrier is shifted in the desired direction carrying the said plug and illuminating element therewith, and furthermore by setting up the carrier with the circuit opening and closing device interposed between the plug and the illuminating element, independent circuit wire connections between said plug and element are dispensed with.

A further object of the invention is to provide a headlight attachment in a manner as hereinafter referred to and for the purpose set forth, including means for shiftably supporting the circuit connecting plug for the illuminating element exteriorly at all times of the headlight casing.

Further objects of the invention are to provide a headlight attachment for the purpose set forth which is simple in its construction and arrangement, strong, durable, compact, thoroughly efficient and convenient in its use, readily set up with respect to the illuminating element of the headlight and comparatively inexpensive.

With the foregoing and other objects in view, the invention consists of the novel construction, combination and arrangement of parts as hereinafter more specifically described and illustrated in the acompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
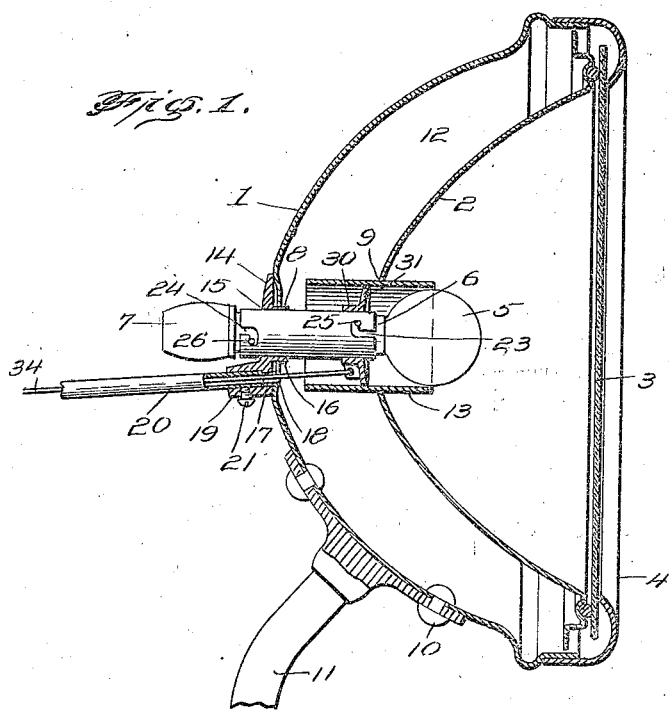
Figure 1 is a vertical sectional view of a headlight, showing the adaptation therewith of an attachment in accordance with this invention and with the illuminating element shifted to a position for intense light.
Figure 2:
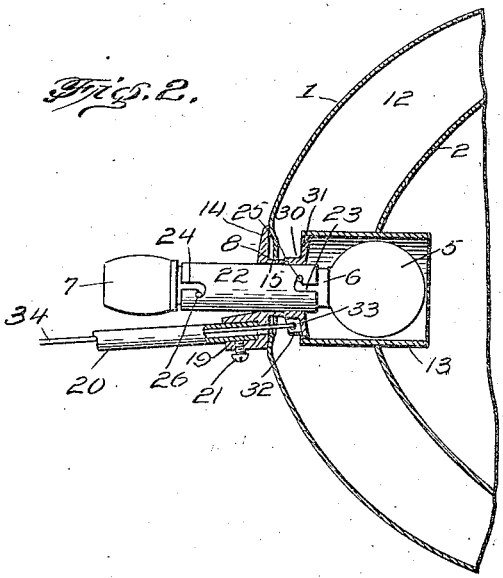
Figure 2 is a fragmentary sectional view of a headlight showing the adaptation therewith of an attachment in accordance with this invention and with the illuminating element shifted for the purpose of dimming the light rays.
Figure 3:
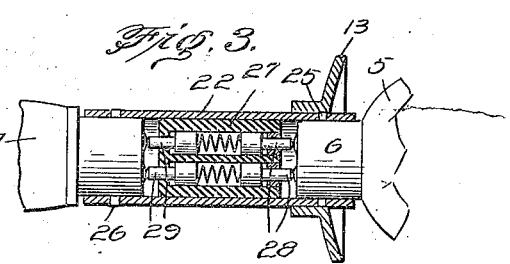
Figure 3 is a longitudinal sectional view of the carrier.

Referring to the drawings, 1 denotes a headlight casing, 2 a reflector arranged therein, 3 a lens, 4 a retaining band for the lens and which is constructed to overlap the open end of the casing, 5 an illuminating element provided with a plug 6, and 7 a circuit connecting plug for the illuminating element. The rear of the casing 1 is provided medially thereof with an opening 8, and the reflector 2 is also provided medially thereof with an opening 9, which is of materially greater diameter than the opening 8. The lower part of the casing 1 has secured therewith by the hold-fast devices 10, a supporting arm 11. The reflector 2 is spaced from the casing 1 to provide a chamber 12.

Secured in any suitable manner to the reflector 2, and extended through the opening 9, is a cylindrical sleeve 13, having each end thereof open and with the body portion thereof imperforate throughout. The sleeve 13 has the major portion of its length arranged within the chamber 12, but the rear end of the sleeve 13 is spaced from the casing 1. The sleeve 13 is of a diameter slightly greater than the diameter of the globe of the illuminating element.

Secured to the rear face of the casing 1, medially thereof, is a combined support and guide member comprising a body portion 14, which may be of any suitable contour, preferably circular, and is provided with a centrally disposed circular opening 15, and with a collar 16 registering with the opening 15. The collar 16 is extended through the opening 8, as well as positioned against the wall of the opening 8 and projects slightly forward of the casing 1. The body portion 14, between its outer edge and the opening 15, is formed with an opening 17, of materially less diameter than the opening 15 and which registers with an opening 18 formed in the casing 1, below the opening 8. The body portion 14, below the opening 15 is formed with a rearwardly projecting hollow tubular extension 19, having its inner diameter greater than the diameter of the opening 17, and said extension 19 communicated with the opening 17. The extension 19 provides what may be termed a socket forming extension into which one end of a guide tube 20 is positioned. The tube 20 is fixedly secured with said extension 19, by a clamping screw 21, and projects rearwardly from the extension 19.

Extended through the opening 15, collar 16 and into the sleeve 13 is a hollow cylindrical carrier 22, which is of a length to permanently project rearwardly from the casing 1, and said carrier 22, at its forward end is formed with a pair of oppositely disposed bayonet slots 23, and at its rear end with a pair of oppositely disposed bayonet shaped slots 24. The carrier 22 is common to and constitutes a shiftable support for the illuminating element 5 and plug 7. The element 5 has its plug 6 formed with lugs 25 whereby said element 5 can be coupled by the lugs 25 and slots 23, with the forward end of the carrier 22. The plug 7 is provided with lugs 26, which in connection with the slots 24 provide means for coupling plug 7 to the rear end of the carrier 22. The element 5, as well as plug 7, are detachably coupled with the carrier 22, and when the carrier 22 is shifted the element 5 and plug 7 are carried therewith. Fixedly secured within the carrier 22, intermediate the ends thereof, is a contact element 27, provided with contacts 28, associating with plug 6 of the element 5, and is also provided with contacts 29 which associate with the plug 7. The contacts 28, 29 are impacted by the element 5 and plug 7, when they are connected with the carrier 22, thereby provide means for closing the illuminating circuit.

Associated with the carrier 22 is an operating means therefor for the purpose of shifting it forwardly and rearwardly when desired, and when shifted rearwardly the element 5 is moved into the sleeve 13 for the purpose of dimming the glare of the light rays and when shifted forwardly the element 5 is projected from the sleeve 13, under such conditions providing for an increase in the glare of the light rays. The said operating means consists of a hub 30, which is fixedly secured to the periphery of the carrier 22, in proximity to the forward end thereof and formed integral with the forward end of the hub 30, is an outwardly extending annular flange 31, which is segment-shaped in cross section and of a diameter to extend to a point in close proximity to the inner face of the sleeve 13, so as to provide a sliding fit between the flange 31 and the sleeve 13 and whereby the flange 31 will constitute a combined guide and support for the forward end of the carrier 22. Formed integral with the hub 30 and also with the flange 31, is a rearwardly extending lug 32 formed with an aperture 33, in which is secured the forward end of the shifting element 34 of the operating means, which is in the form of an elongated wire rod which extends through the openings 17 and 18 and also through the guide tube 20 and the function of which is to shift the carrier 22 in a forward direction or in a rearward direction when desired. The hub 30, in connection with the collar 16, limits the rearward movement of the carrier 22, and the plug 7, in connection with the body portion 14 of the combined guide and support limits the forward movement of the carrier 22.

Although the preferred embodiment of the invention is as described and illustrated, yet it is to be understood that changes in the details of construction can be had which will fall within the light of the invention as claimed.

What I claim is:—

1. A headlight attachment for the purpose set forth comprising a sleeve adapted to be secured intermediate its end to the reflector of a headlight centrally thereof, a combined guide and supporting member adapted to be secured to the rear of the headlight casing and formed of a forwardly extending collar extended into said casing, a shiftable carrier having means for connecting an illuminating element and a connecting plug respectively with the front and rear ends thereof, said carrier supported by said collar and extending into said sleeve and projecting rearwardly from the collar, a hub mounted on said carrier and provided with means arranged within and engaging said sleeve to constitute a combined guide and support for the forward end of the carrier, and means extending through said member below the collar and connected with said hub for shifting the carrier to move said element forwardly and rearwardly with respect to the reflector to provide for the increasing and diminishing of the glare of the light rays from the illuminating element.

2. A headlight attachment for the purpose set forth comprising a sleeve adapted to be secured intermediate its ends to the reflector of a headlight rearwardly thereof, a combined guide and supporting member adapted to be secured to the rear of the headlight casing and formed of a forwardly extending collar extended into said casing, a shiftable carrier having means for connecting an illuminating element and a connecting plug respectively with the front and rear ends thereof, said carrier supported by said collar and extending into said sleeve and projecting rearwardly from the collar, a hub mounted on said carrier and provided with means arranged within and engaging said sleeve to constitute a combined guide and support for the forward end of the carrier, and means extending through said member below the collar and connected with said hub for shifting the carrier to move said element forwardly and rearwardly with respect to the reflector to provide for the increasing and diminishing of the glare of the light rays from the illuminating element, said member formed with a rearwardly projecting hollow tubular extension, and a guide tube for said means, said guide tube projecting into and secured with said extension.

3. A headlight attachment for the purpose set forth comprising a sleeve adapted to be secured intermediate its ends to the reflector of a headlight, a combined guide and supporting member secured at the rear of the headlight casing and having a collar extended into the casing, a shiftable illuminating element and plug carrier extending through and supported by said collar and further projecting into said sleeve, said carrier extending rearwardly from said member, a hub secured to the carrier and provided with an annular flange engaging the inner face of the sleeve to constitute a combined guide and support for the forward end of the carrier, said hub having an apertured lug, and means extending through said member below the collar and connected with said lug for shifting the carrier to move the illuminating element forwardly and rearwardly with respect to the reflector.

In testimony whereof, I affix my signature hereto.

HOMER H. TRAVIS.